Jan. 10, 1961     L. T. SKEGGS     2,967,764

APPARATUS FOR ANALYSIS AND OTHER PROCESSING OF FLUIDS

Filed April 24, 1958

INVENTOR.
Leonard T. Skeggs
BY
ATTORNEYS

United States Patent Office 2,967,764
Patented Jan. 10, 1961

2,967,764

APPARATUS FOR ANALYSIS AND OTHER PROCESSING OF FLUIDS

Leonard T. Skeggs, Cleveland, Ohio, assignor to Technicon Instruments Corporation, Chauncey, N.Y., a corporation of New York Filed Apr. 24, 1958, Ser. No. 730,613

7 Claims. (Cl. 23—253)

The present invention relates to a method and apparatus for use in analysis, monitoring, control and other operations, and more particularly to a method and apparatus for the quantitative determination of carbon dioxide in a liquid or gaseous fluid containing the same, and for the quantitative determination of any compound from which carbon dioxide can be liberated, or for monitoring or controlling various chemical processes in which carbon dioxide is utilized or which involves the production or use of carbonates or bicarbonates or other compounds from which carbon dioxide can be liberated.

One object of the present invention is the provision of a method and apparatus for the quantitative determination of carbon dioxide contained either in a liquid or gaseous fluid, said method and apparatus being of such character that the determination whether for analysis, monitoring, control, or other purposes is facilitated and accomplished in a simple and convenient way without requiring the use of test tubes, pipettes, or other measuring devices, and characterized further in that a plurality of samples of gaseous or liquid fluids containing carbon dioxide may be processed in the manner just indicated in succession, one after another and, if desired, records of the determinations may be automatically made during the performance of the method and the operation of the apparatus.

Another object of the present invention is the provision of a method and apparatus of the above indicated character which is well adapted for the quantitative determination of various carbonates and bicarbonates or other compounds from which carbon dioxide can be liberated.

A further object of the invention is to provide an improved method and apparatus of the above indicated character for obtaining a quantitative determination of carbon dioxide in blood.

A yet further object of the invention is generally to provide an improved means and method for the quantitative determination of carbon dioxide and compounds from which carbon dioxide can be liberated, especially for the utilization of such determination for various purposes such as for example, but without limitation, for analysis, monitoring and control purposes.

The above and other objects, features and advantages of the present invention will be fully understood from the following description considered in connection with the accompanying illustrative drawings.

Figure 1:
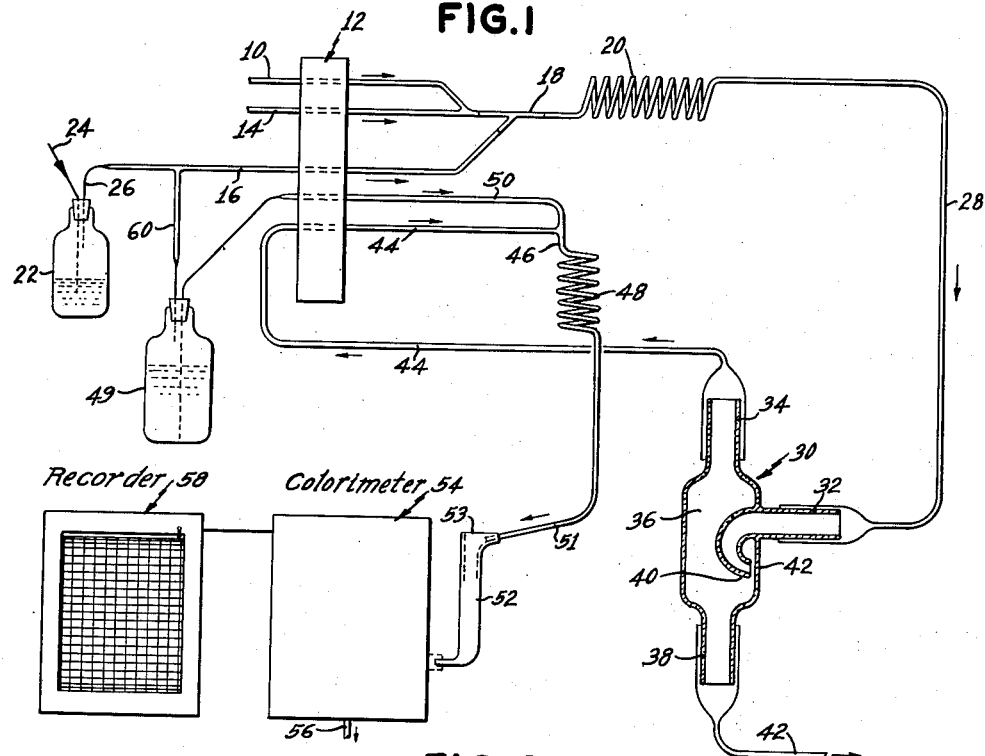
Fig. 1 is a more or less diagrammatic view of a method and apparatus in accordance with the present invention, illustrating the method and apparatus especially for the determination of carbon dioxide or a carbonate or bicarbonate or other compound from which carbon dioxide can be liberated, where the fluid in which said substances are contained is in a liquid phase.

Referring now to the drawings in detail and first to the method and apparatus illustrated by Fig. 1, a sample of liquid, for example a solution of a carbonate or a bicarbonate containing the substance in respect to which the quantitative determination is to be obtained is supplied from a source not shown to a tubular conduit 10 by means of a pump indicated diagrammatically at 12, and a liquid for liberating carbon dioxide from the liquid flowing through tube 10 is supplied to a tube 14 and caused to flow therethrough by pump 12.

Preferably, the liquid employed for liberating carbon dioxide from the liquid supplied to tube 10 is a dilute acid such as for example lactic acid. Air is supplied through a tube 16 to the tube 18 which is connected at one end to the tubes 10 and 14 and at its other end to a mixing coil 20 which is preferably formed of glass and as here shown is in the form of a helical coil for effecting a thorough mixing of the liquids pumped through tubes 10 and 14 by pump 12. The air is also pumped by pump 12 through tube 16 and serves to segmentize the fluid stream flowing through tube 18 into coil 20 into alternate segments L and G of liquid and gaseous segments, respectively. The air pumped through tube 16 is preliminarily treated to free it from carbon dioxide which might be contained therein. For this purpose, the air is subjected to the action of a suitable liquid, sodium hydroxide for example, contained in a receptacle 22 for abstracting any carbon dioxide which may be present. The air is admitted through the inlet tube 24 and after bubbling through the sodium hydroxide in receptacle 22 flows through the outlet tube 26 into air supply tube 16.

In the course of the flow of the liquids through tube 18 and mixing coil 20 carbon dioxide is liberated and mixes with the air supplied by tube 16. The air introduced into tube 18 not only acts to separate each sample of liquid from the following sample supplied to tube 10 but also serves to divide the fluid stream into alternate liquid segments L and gaseous fluid segments G (Fig. 3) and further acts as a carrier for the liberated $CO_2$ in the subsequent processing of the gaseous stream. The outlet of mixing coil 20 is connected by means of a tube 28 to a gas and liquid separator 30. More particularly, said gas and liquid separator 30 is preferably formed of glass but may be made of other material inert to the fluids supplied thereto and is provided with an inlet 32 for the fluid stream supplied thereto by the tube 28, with an outlet 34 for the gaseous fluid separated from the liquid in the separator chamber 36, and with an outlet 38 for the liquid separated from the gaseous fluids in said chamber 36. Preferably, as here shown separator 30 including the inlet tube 32, the outlets 34 and 38 are in integral relation with the chamber part 36. It will be observed that inlet 32 terminates in a reflexed nozzle portion 40 which directs the fluid against the adjacent side wall 42 of the separator so that the liquid runs down the side wall by gravity and under gaseous pressure as hereinafter more specifically described to the outlet 38 from which it is conducted to waste or for some other operation by tube 43.

Figure 3:
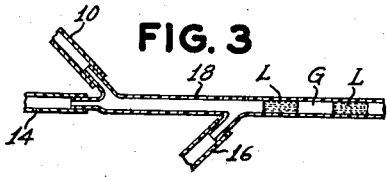
Fig. 3 is a view of part of the apparatus illustrating the formation of gas and liquid segments in a fluid stream utilized in the practise of the invention.

The gaseous fluids, consisting of a mixture of air and carbon dioxide flow from the outlet 34 through a tube 44 to the inlet 46 of mixing coil 48 which may be the same as or similar to the mixing coil 20. A weak alkaline solution containing a color reagent is supplied from the receptacle 49 via tube 50 to the inlet end of said mixing coil 48 whereby the carbon dioxide flowing through said coil is effectively treated with said alkaline solution containing said color reagent. In the course of the flow of the gaseous and liquid fluids through mixing coil 48 the carbon dioxide is dissolved in said alkaline solution and the resulting fluid stream composed of segments L of said liquid and intervening segments G of air, which is also illustrated by Fig. 3, flows through tube 51 to the upper end of the blender tube or chamber 52 which is connected at its lower end to the flow cell or cuvette of a colorimeter 54 of the flow-cell type. In chamber 52, the liquid segments are blended and consolidated into a liquid column and the air or other gas not absorbed into the liquid is vented from the blender 52 through the outlet 53 thereof. The liquid outlet from the flow cell of said colorimeter is indicated at 56. As here shown, recorder 58 is operable under the control of the photo-tube circuit of the colorimeter 54 in a well known way, for controlling the operation of the recorder 58 which is of the well known self-balancing slide wire type. As colorimeters and recorders of the type just referred to are well known and do not per se form part of the present invention, it is considered that further description of either the colorimeter or the recorder is unnecessary.

It will be observed that a branch tube 60 leads from the air tube 16 into the receptacle 49 for supplying air free of carbon dioxide to said receptacle above the level of liquid therein so that the liquid in said receptacle is maintained under sufficient pressure to enable the pump 12 to aspirate the liquid from said receptacle into tube 50.

While any suitable proportioning pump 12 may be employed, a proportioning pump of the type in which the tubes 10, 14, 16 and 50 are resiliently flexible and are compressed progressively along their lengths by pressure rollers is preferably used in the apparatus of the present invention. It will be understood that the internal diameters of the flexible tubes 10, 14, 16 and 50 are such that with a constant operating speed of the pump, the fluids are pumped through said tubes in predetermined relative proportions and hence are metered by the pump 12 without requiring any other measuring operations.

The following is an illustrative but non-limitative example of a method of the present invention employed for the determination of carbon dioxide in blood plasma.

It will be understood that in the case of serum or plasma, carbon dioxide is or may be both (1) physically dissolved as free carbon dioxide in the serum or plasma and (2) it may be contained in an aqueous solution of sodium or potassium bicarbonate in the serum or plasma. The blood plasma is pumped through tube 10 at the rate of .32 ml. per minute; 0.1 n lactic acid is pumped through tube 14 at the rate of 1.5 ml. per minute; air free of carbon dioxide is pumped through tube 16 at the rate of 5.0 ml. per minute; and the alkaline liquid containing the color reagent is pumped through tube 50 at the rate of 5.0 ml. per minute. The internal diameter of tube 44 is .25 mm., which is approximately half of the internal diameter of tube 16. As a result, only part of the gaseous fluid which enters the separator 30 is drawn through the outlet 34, the remaining part of the gaseous fluid being therefore effective to provide pressure in the separator chamber 36 for discharging liquid from said chamber through outlet 38. In the example now under discussion the 0.1 n lactic acid is prepared by adding 9.2 mm. of 85% lactic acid per liter made up of said acid and distilled water. A small quantity of any suitable anti-foam liquid is incorporated in the weak lactic acid supplied to tube 14. The liquid containing the color reagent is prepared with a carbonate-bicarbonate buffer composed of one part of 1 molar carbonate ($Na_2CO_3$) to two parts of 1 molar bicarbonate ($NaHCO_3$). The color indicator is made up of one gram of phenolphthalein in 100 ml. of methyl alcohol. The alkaline liquid color reagent is prepared by mixing 4.5 ml. of said buffer and 4.0 ml. of said phenolphthalein indicator with sufficient distilled water to make up one liter of the liquid, a few drops of capryl alcohol being incorporated as an anti-foaming agent.

The above described example is illustrative not only for the determination of carbon dioxide in serum or plasma but is also applicable for the determination of carbonates in water, and it is therefore obvious that the above description is also illustrative of the use of the present method for water analysis with respect to the carbonate ingredient which causes water hardness, and further the apparatus described above may be used for the monitoring of water treating columns. More particularly, by analyzing the outlet of a water treating column a water softening process may be monitored, continuously or at intervals by the apparatus illustrated in Fig. 1, and further, if desired, suitable solenoid control valves may be provided for operation under the control of the photo-tube circuit of the colorimeter 54, with suitable amplification if necessary, for transferring the water supply line for the flow of water through successive water softening columns when the efficacy of one water treating column is diminished below a predetermined amount as determined by the apparatus and particularly the photo-tube circuit of the colorimeter 54. On the other hand, if desired, the transfer of the supply of water from one water treating column to another may be manually effected pursuant to indications on the colorimeter recorder 58.

Figure 2:
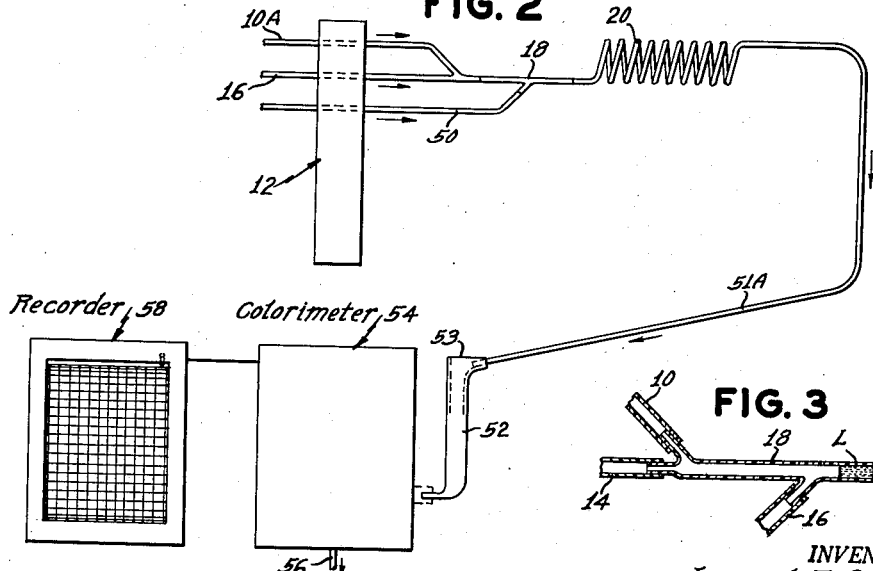
Fig. 2 is a view similar to Fig. 1 but illustrates the method and apparatus for use where the determination is to be made in respect to a substance contained in a gaseous fluid.

Referring now to the form of the invention illustrated by Fig. 2, provision is made for obtaining a determination of carbon dioxide contained in air or other gaseous fluids. In the apparatus illustrated by Fig. 2 the parts designated by the same numerals correspond to the parts designated by the same numerals as those appearing in Fig. 1 are of the same construction as said parts of Fig. 1. As here shown the gaseous fluid containing carbon dioxide is pumped through the tube 10A, air free of carbon dioxide is pumped through the tube 16, and the liquid containing the color reagent is pumped through the tube 50. These fluids flow through the tube 18 and mixing coil 20 and a tube 51A to the inlet of the blender 53. It will be understood that the air, free of carbon dioxide, supplied through the tube 16 in the manner described above is effective to divide the fluid stream flowing through tube 18 into alternate segments of liquid and gaseous fluids as illustrated by Fig. 3 described above with specific reference to the apparatus of Fig. 1. The addition of air by means of tube 16 to the gaseous fluid flowing through tube 10A, as a result of the operation of the proportioning pump 12, not only serves to segmentize the fluid stream, but also serves to act as a carrier or vehicle for the carbon dioxide conducted for absorption into the alkaline liquid supplied through the tube 50. As a non-limitative illustrative example of the method according to Fig. 2, the flow of the gaseous fluid for which analysis with respect to the amount of carbon dioxide which may be contained therein is desired is at the rate of 0.7 ml. per minute in tube 10A; the flow of air, free of $CO_2$, in tube 16 is at the rate of 0.7 ml. per minute; and the flow of the liquid containing color reagent in tube 50 is at the rate of 2.0 ml. per minute. Said alkaline liquid containing the color reagent is preferably the same as the alkaline liquid and color reagent supplied in performing the method illustrated in Fig. 1, and as illustrated the provision for supplying said liquid and the air free of carbon dioxide to tubes 50 and 16, respectively, is the same as in Fig. 1.

It will be understood in both forms of the invention the absorption of the carbon dioxide in the alkaline solution which contains the color indicator, causes a decrease in pH which is reflected by a change in color, and since this colored solution flows through the cuvette of the colorimeter, the response of the photo-tube electric circuit is controlled by the depth of color or light transmission characteristic of the liquid which flows through the colorimeter, so that the response of the photo-electric tube circuit may be utilized for controlling the operation of the recorder to provide a record of the determination of carbon dioxide. Of course it will be understood that a similar operation is involved for the determination of compounds from which carbon dioxide can be released, since the quantitative determination of the released carbon dioxide is at the same time useful for providing a quantitative determination of the part of the compound from which the carbon dioxide is released. Among the compounds from which carbon dioxide can be liberated, and to which the method and apparatus of the present invention is applicable are, without limitation, calcium carbonate, sodium carbonate, potassium carbonate, sodium bicarbonate, potassium bicarbonate and urea.

It will be understood further that in both forms of the preesnt invention, the air supplied through the tube 14 in Fig. 1 and through tube 16 in Fig. 2 is operable not only to divide the fluid stream into alternate gaseous and liquid segments, but also serves to separate one sample of fluid admitted into tube 10 or 10A from the next sample and to cleanse the tubular passages, the air in this respect having functions similar to that described in United States Patent No. 2,797,149, issued June 25, 1957, for my invention in Methods of and Apparatus for Analyzing Liquids Containing Crystalloid and Non-Crystalloid Constitutents. It is to be noted, however, that the present method of determining carbon dioxide in a gaseous fluid stream as described above, for example with respect to Fig. 2, involves the formation of gas bubbles as a component of a fluid stream for the purpose of effecting a reaction of the gas, with respect to which the quantitative determination is to be made, with the liquid phase of the fluid stream into which the liquid is introduced. Similarly in the form of the invention illustrated in Fig. 1, the carbon dioxide released from the liquid sample by the addition of the acid thereto reacts with the alkaline liquid supplied through the tube 50. In both forms of the invention the gas with respect to which the determination is to be made is thus formed into bubbles and in such form is brought into intimate relation with the liquid with which the said gas reacts.

While I have shown and described the presently preferred embodiment of the present invention, it will be understood that the invention may be carried out otherwise than as herein illustrated or described and that in the illustrated embodiment certain changes in the details of construction and in the mode of practicing the invention may be made without departing from the underlying idea or principles of this invention within the scope of the appended claims.

Having thus described my invention, what I claim and desire to secure by Letters Patent is:

1. Apparatus for treating a liquid for analysis or other processing in respect to a substance from which a gas can be liberated, comprising conduit means, means for pumping said liquid and a reagent in predetermined relative proportions through said conduit whereby said gas is generated in said conduit during the flow of said fluids therethrough, gas and liquid separator means in fluid-flow communication with said conduit means to receive the gaseous and liquid constituents of the fluid stream flowing through said conduit means, second conduit means, and means for transmitting at least part of said gas separated from the liquid, at a predetermined rate of flow to said second conduit means, for further processing during the flow of the gas through said second conduit means.

2. Apparatus for treating a liquid for analysis or other processing in respect to a substance from which a gas can be liberated by treatment of said fluid with a reagent, comprising conduit means, means for pumping said liquid, air, and an acid liquid in predetermined relative proportions through said conduit whereby said gas is generated in said conduit during the flow of said fluids therethrough, means for treating said air to remove carbon dioxide therefrom before the air is introduced into said conduit, gas and liquid separator means in fluid-flow communication with said conduit means to receive the gaseous and liquid constituents of the fluid stream flowing through said conduit means, a second conduit, means for pumping gaseous fluid from said separator into said second conduit and for simultaneously pumping through said second conduit a liquid which changes in color according to the quantity of the liberated gas transmitted from said separator to said second conduit, and color-responsive means operatively connected to said second conduit and operable under the control of said last mentioned liquid in accordance with the color thereof.

3. Apparatus according to claim 2, comprising means for removing the air from the last mentioned liquid before subjecting said color-responsive device to the control of said last mentioned liquid.

4. Apparatus for treating a fluid for analysis or other processing in respect to carbon dioxide as a constituent thereof, comprising fluid-conduit means, means for transmitting streams of said fluid, an inert gas, and a processing liquid through said conduit means in predetermined relative proportions, and means for treating said stream of inert gas to remove carbon dioxide therefrom before the stream of inert gas is introduced into said conduit means.

5. Apparatus for treating a liquid for analysis or other processing wherein a gas is liberated, comprising conduit means for the flow of said liquid and a first processing fluid therein, a gas and liquid separator having an inlet to receive fluid from said conduit means and provided with a gas outlet, a conduit for a second processing fluid connected to said gas outlet, means for pumping said liquid and said first processing fluid in predetermined relative proportions in said conduit means for processing said first liquid, gas being thereby liberated in said conduit means and transmitted together with said liquid to said separator, means for pumping said second processing fluid through said conduit therefor at a predetermined rate of flow, and means for introducing gas from said separator through said gas outlet into said conduit for said second processing fluid at a predetermined rate of flow in relation to the rate of flow of said second processing fluid.

6. Apparatus for treating a liquid for analysis with respect to a substance contained therein and separable therefrom in the form of a gas, comprising conduit means, means for pumping in predetermined relative proportions a stream of said liquid, a stream of a reagent for liberating said substance from said liquid in gaseous form, and a stream of an inert gas through said conduit means wherein at least a portion of said substance is separated from said liquid in the form of a gas during the flow of said fluids therethrough, a gas and liquid separator in fluid communication with said conduit means for separating said gas and liquid constituents of the fluid stream flowing through said conduit means, and means for transmitting at least a portion of said separated substance in gaseous form for further processing.

7. Apparatus for treating a liquid for analysis with respect to a substance contained therein and separable therefrom in the form of a gas, comprising conduit means, means for pumping a stream of said liquid, a stream of a reagent for liberating said substance from said liquid in gaseous form, and a stream of an inert gas through said conduit means wherein at least a portion of said substance is separated from said liquid in the form of a gas during the flow of said fluids therethrough, means for treating said inert gas for removing any of the said substance contained therein before said inert gas is introduced into said conduit means, a gas and liquid separator in fluid communication with said conduit means for separating said gas and liquid constituents of the fluid stream flowing through said conduit means, mixing means, and means for transmitting at least a portion of said separated substance in gaseous form and a reagent therefor in predetermined relative proportions to said mixing means for mixing with said reagent therein.

References Cited in the file of this patent

UNITED STATES PATENTS

| | | |
|---|---|---|
| 131,807 | Basset | Oct. 1, 1872 |
| 1,223,101 | Pacziga | Apr. 17, 1917 |
| 1,382,072 | Finkl | June 21, 1921 |
| 2,102,282 | Roy | Dec. 14, 1937 |
| 2,797,149 | Skeggs | June 25, 1957 |
| 2,865,303 | Ferrari | Dec. 23, 1958 |
| 2,893,510 | Spann | July 7, 1959 |
| 2,911,059 | Spann | Nov. 3, 1959 |

OTHER REFERENCES

Technicon Inst. Corp. "Auto Analyzer" pamphlet IC–IOM–9–57G, printed U.S.A. September 1957.

Snell: "Col. Meth., of Anal.," vol. 11, 3rd ed., 1949, pp. 843–855.